(12) United States Patent
Hublitz et al.

(10) Patent No.: US 7,631,204 B2
(45) Date of Patent: Dec. 8, 2009

(54) POWER SUPPLY DEVICE HAVING COMMUNICATION CHANNELS WITH DIFFERENT TYPES OF COMMUNICATION CONNECTIONS

(75) Inventors: Dieter Hublitz, Niederwern (DE); Harald Möhler, Nürnberg (DE)

(73) Assignee: Siemens Aktiengessellschaft, Munich (DE)

( * ) Notice: Subject to any disclaimer, the term of this patent is extended or adjusted under 35 U.S.C. 154(b) by 501 days.

(21) Appl. No.: 11/587,898

(22) PCT Filed: Apr. 22, 2005

(86) PCT No.: PCT/EP2005/051823

§ 371 (c)(1),
(2), (4) Date: Oct. 27, 2006

(87) PCT Pub. No.: WO2005/107035

PCT Pub. Date: Nov. 10, 2005

(65) Prior Publication Data

US 2008/0086649 A1    Apr. 10, 2008

(30) Foreign Application Priority Data

Apr. 30, 2004   (DE) ................. 10 2004 021 380

(51) Int. Cl.
*G06F 1/26* (2006.01)
(52) U.S. Cl. .................. 713/310; 713/300; 713/340
(58) Field of Classification Search ............ 713/310
See application file for complete search history.

(56) References Cited

U.S. PATENT DOCUMENTS

| 5,652,893 | A | * | 7/1997 | Ben-Meir et al. | ........... 713/310 |
| 5,731,688 | A | | 3/1998 | Thomson | |
| 5,844,327 | A | | 12/1998 | Batson | |
| 6,675,302 | B2 | * | 1/2004 | Ykema | ............... 713/300 |
| 7,437,217 | B2 | * | 10/2008 | Lehr et al. | .............. 700/297 |
| 7,466,819 | B2 | * | 12/2008 | Lehr et al. | .......... 379/399.01 |
| 7,509,506 | B2 | * | 3/2009 | Bahali et al. | ............. 713/300 |
| 2002/0190576 | A1 | | 12/2002 | Kern et al. | |
| 2003/0187520 | A1 | | 10/2003 | Pearlman et al. | |

FOREIGN PATENT DOCUMENTS

| JP | 05250344 A1 | 9/1993 |
| JP | 11178247 A | 7/1999 |
| JP | 2000047652 A | 2/2000 |
| JP | 2002095072 A | 3/2003 |
| JP | 2004257955 A | 9/2004 |

* cited by examiner

Primary Examiner—Nitin C Patel

(57) ABSTRACT

The invention relates to a power supply device that has a plurality of power supply components. The power supply components are provided with one communication interface each and are linked with a common analysis and control unit via the communication interface and a communication channel. The analysis and control unit controls a load moment of the power supply components. The analysis and control unit feeds control signals to the power supply based upon the mode of operation if the power supply is switched over or reprogrammed.

15 Claims, 1 Drawing Sheet

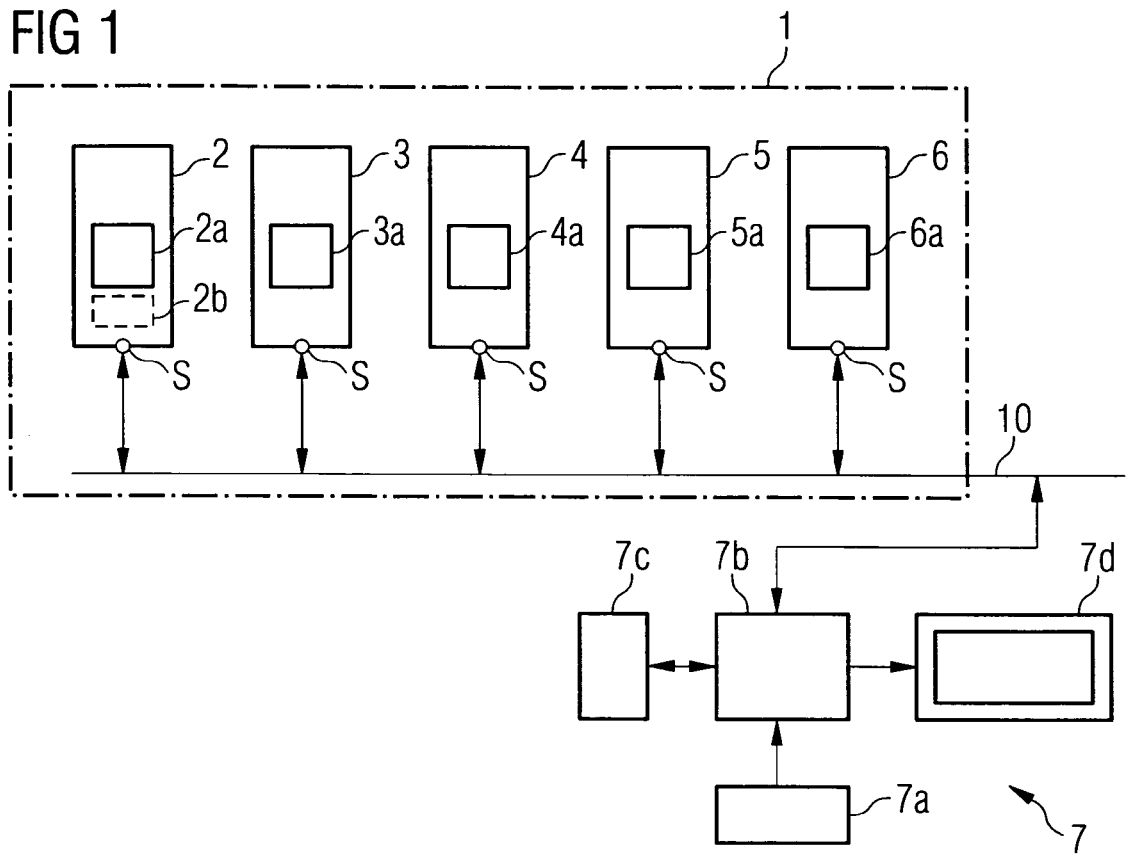
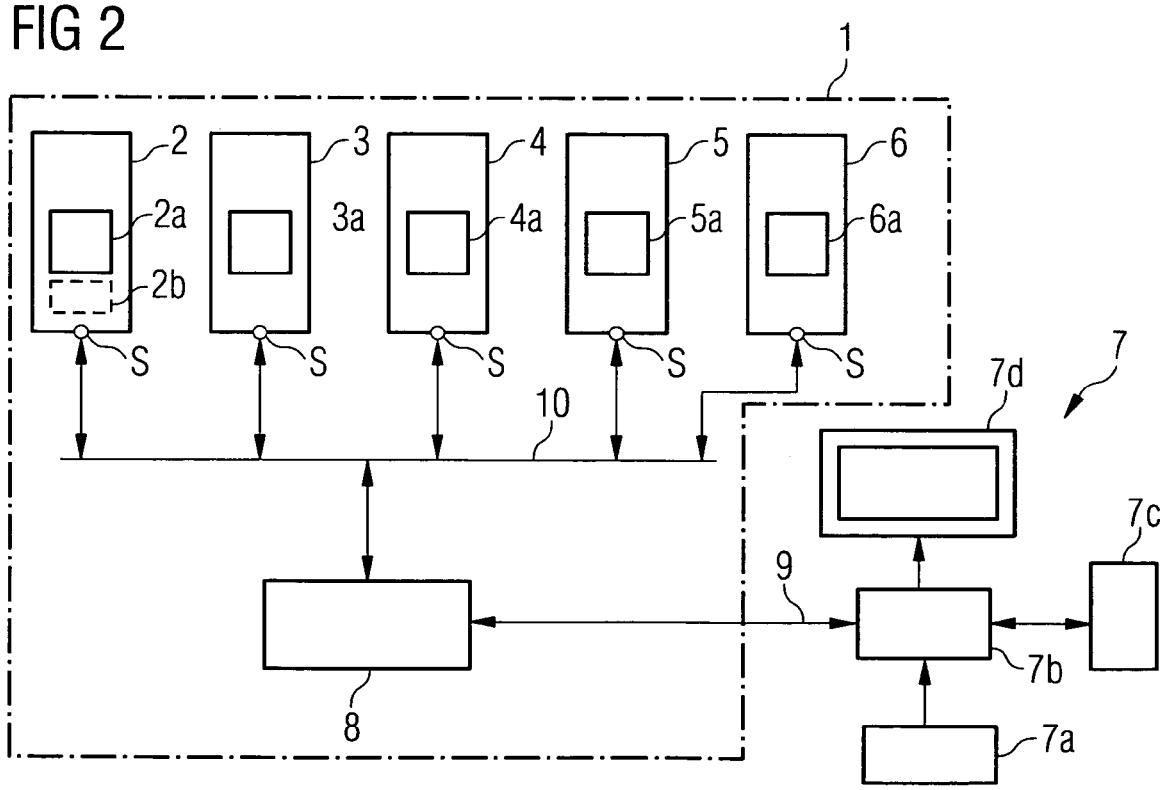

US 7,631,204 B2

POWER SUPPLY DEVICE HAVING COMMUNICATION CHANNELS WITH DIFFERENT TYPES OF COMMUNICATION CONNECTIONS

CROSS REFERENCE TO RELATED APPLICATIONS

This application is the US National Stage of International Application No. PCT/EP2005/051823 filed Apr. 22, 2005 and claims the benefits of and priority thereof. The International Application claims the benefits of and priority from German application No. 102004021380.1 filed Apr. 30, 2004. Both of the applications are incorporated by reference herein in their entirety.

FIELD OF THE INVENTION

The invention relates to a power supply device that comprises a plurality of power supply components.

BACKGROUND OF THE INVENTION

Power supplies are customarily operated as stand-alone devices As a rule, they are fitted with a simple indicator contact. It can in this way be indicated whether the status of the power supply is currently undisturbed or faulty.

Power supplies typically convert a high voltage level on the input side, for example a 230V alternating voltage or a 400V alternating voltage, to a low voltage level, for example a direct voltage of 24V. By this means, consumers such as sensors, electronic controls, valves and pumps can be operated with a suitable voltage, without the need for a separate power supply for each individual consumer. Power supplies of this type are used on a large scale in production and automation engineering, for example.

A diagnostic unit for a power supply and a power supply fitted with a diagnostic unit are described in DE 103 55 613.3. The diagnostic unit monitors the power supply on the output side for an inadmissible deviation from a reference value of at least one parameter to be monitored. In the event of an inadmissible deviation from the reference value, the diagnostic unit records measurement values on the input side of the power supply in the period of time surrounding the inadmissible deviation in a time window. The diagnostic unit then files the relevant measurement values in a memory. The result is that the deviation of a parameter to be monitored which is caused by a fault on the mains side, for example an underrun of the output voltage, can be documented with certainty. In this way, it can be proven to an operator of the power supply that it is not the power supply but the superordinate power network which is failing to meet the requirements specified for operating power supplies. Network faults on the input and output side and equipment faults on the power-supply side can be recorded, interrogated and analyzed smoothly and promptly at low cost. In one embodiment, the diagnostic unit has a communication interface for reading out the memory. The memory comprising the measurement values can be read out via this interface and evaluated, for example on a linked personal computer with suitable software. Remote control is also possible via the communication interface of the diagnostic unit. Here, online measurement values can be transmitted to a linked personal computer and evaluated. The facility also exists for loading new firmware or new values for the parameters being monitored into the control unit of the diagnostic unit.

SUMMARY OF THE INVENTION

The object of the invention is to improve the mode of operation of the known power supply.

The advantages of the invention are in particular that, by virtue of the communication capability of all the power supply components, all internal parameters of the power supply can be evaluated, logged, adjusted and controlled. It is in this way possible to implement a power supply management in which all the internal parameters of the power supply are taken into account.

If the power supply components are connected via a concentrator to the common analysis and control unit, then the communication channel between the concentrator and the analysis and control unit can in an advantageous manner be implemented differently from the connections between the power supply components and the concentrator. For example, the connections between the power supply components and the concentrator can be a bus implemented using cables, while the concentrator is connected to the analysis and control unit via a wireless communication channel, for example a radio transmission link.

The analysis and control unit preferably has a memory which is provided for permanently storing or logging the status messages concerning the power supply components. The stored values are available for a later precise analysis of the power supply device, for example for analysis in the event of an operating failure.

According to a further embodiment of the invention, the power supply components are also each equipped with a memory. This memory, which can be implemented in the form of a ring memory, stores for the duration of a defined time window parameters pertaining to the respective power supply component and then makes them available to the analysis and control unit on request.

BRIEF DESCRIPTION OF THE DRAWINGS

Further advantageous characteristics of the invention will emerge from the explanation of examples thereof with reference to the drawings, in which:

FIG. 1: shows a block diagram of a first exemplary embodiment of a power supply device and FIG. 2: shows a block diagram of a second exemplary embodiment of a power supply device.

DETAILED DESCRIPTION OF THE DRAWINGS

FIG. 1 shows a block diagram of a first exemplary embodiment of a power supply device. The device shown comprises a power supply 1 which contains a plurality of power supply components 2, 3, 4, 5, 6. These power supply components are a basic device 2, a buffer module 3, an uninterruptible power supply module 4, a redundancy module 5 and a diagnostic module 6. The basic unit 2 is connected to the AC network and provides on the output side a regulated direct voltage supply of 24V. The buffer module 3 serves in bridging short-term network interruptions. The uninterruptible power supply module 4 serves in bridging longer network interruptions. The redundancy module 5 is activated for example in the event of a fault in the basic unit 2 or else in the event of a high loading of the power supply. The diagnostic module 6 serves in monitoring the output side of the power supply 1 for an inadmissible deviation from a reference value of a parameter to be monitored.

The basic unit 2 has a memory 2a. The buffer module 3 is equipped with a memory 3a. A memory 4a belongs to the uninterruptible power supply module 4. The redundancy module 5 is fitted with a memory 5a. The diagnostic module 6 contains a memory 6a. These memories 2a, 3a, 4a, 5a and 6a are each implemented in the form of a ring memory and for the duration of a predetermined time window store data that describes the states of the respective components.

This data is then output cyclically, after expiration of predetermined time intervals or when requested by an external analysis and control unit 7 at an interface S of the respective component and made available to a bus 10. This bus can be the Ethernet, a Profibus, an IEC bus or a CAN bus. Alternatively, the interfaces S can also be interfaces to the Internet, GSM interfaces, UMTS interfaces, USB interfaces, radio interfaces or infrared interfaces.

The external analysis and control unit 7 is preferably a personal computer. This computer comprises a keyboard 7a, a processor 7b, a memory 7c and a display 7d. The analysis and control unit 7 receives and analyzes the data, transmitted via the bus 10, of the individual components 2, 3, 4, 5 and 6 of the power supply 1. The analysis and control unit 7 is therefore constantly informed about all internal parameters of the power supply 1 and as a consequence thereof is capable of implementing power supply management. In doing so, it outputs command or control signals or control programs which are transmitted via the bus 10 to the respective component 2, 3, 4, 5 or 6 of the power supply 1 and influence the mode of operation of the respective component. Furthermore, the processor unit 7b ensures that data corresponding to the internal parameters of the power supply 1 is permanently stored or logged in a memory area of the memory 7c such that it is available if required for a later evaluation. The processor unit 7b also ensures that, for power supply monitoring purposes, diagrams or tables are represented on the display 7d in alphanumeric and/or graphic form, which diagrams or tables give the service personnel of the respective installation information about the states of the individual power supply components.

Examples of status messages which are transmitted from the individual power supply components via the bus 10 to the analysis and control unit 7 are:

The basic unit 2 reports to the analysis and control unit 7 the measured output current and the measured output voltage, information about whether the status of the basic unit is faulty or undisturbed, information about whether a short circuit has occurred, information about whether an overload has occurred, information about ambient internal parameters of the basic unit, for example about the temperature and the humidity prevailing there, and information about further target and actual values.

The buffer module 3 reports to the analysis and control unit 7 the current state of charge, information about whether the status of the buffer module is faulty or undisturbed, information about whether the buffer module is currently active, inactive or in standby mode, as well as further target and actual values.

The uninterruptible power supply module 4 reports to the analysis and control unit 7 whether the buffering is faulty or undisturbed, whether the module is in use or in standby mode, what the state of charge of the accumulator is, whether an accumulator replacement is due or not, the buffer time remaining, signals relating to battery protection (deep-discharging protection, wire breakage, polarity inversion, etc.) and the duration of the buffer time.

The redundancy module 5 reports to the analysis and control unit 7 whether the power supply is faulty or undisturbed, whether a short circuit has occurred, whether an overload has occurred and whether the total current is too high, as a result of which redundancy operation is no longer possible.

The diagnostic module 6 also provides the analysis and control unit 7 with message signals which relate to the current operating status and the operability of the diagnostic module 6.

The analysis and control unit 7 returns the following control signals for example via the bus 6 to the individual components:

control signals which adjust the output voltage of the basic unit 2, control signals which adjust the current limitation of the basic unit 2, control signals which adjust the overload behavior of the basic unit 2, control signals which bring about a switch of characteristics, control signals which relate to the accumulator charging of the uninterruptible power supply 4, Control signals which relate to a switch between buffering mode and charging mode of the uninterruptible power supply 4, Control signals which relate to the current limitation in buffering mode, Control signals which relate to accumulator test parameters, etc.

FIG. 2 shows a block diagram of a second exemplary embodiment of a power supply device. The device shown in FIG. 2 differs from the device shown in FIG. 1 only in that a concentrator 8 is disposed between the power supply components 2, 3, 4, 5, 6 of the power supply 1 and the analysis and control device 7. This concentrator 8 is connected via a bus 10 to the said power supply components 2, 3, 4, 5, 6. Furthermore, the concentrator 8 is connected via a communication channel 9 to the external analysis and control unit 7.

The advantage of this second exemplary embodiment is in particular that the connections provided between the power supply components and the concentrator 8 can be implemented in a different manner from the connection 9 provided between the concentrator 8 and the analysis and control unit 7. For example, the connections provided between the power supply components 2, 3, 4, 5, 6 and the concentrator 8 are wired bus lines, while the communication channel 9 between the concentrator 8 and the analysis and control unit 7 is, for example, a radio transmission link or the Internet. This makes it possible to provide the analysis and control unit 7 at a large distance from the concentrator 8 and thus also at a large distance from the power supply 1.

A power supply device according to the present invention accordingly comprises a plurality of power supply components which each have a communication interface. Via this communication interface they are connected directly or via a concentrator to an external analysis and control unit. This analysis and control unit monitors for online operating purposes all the parameters of the power supply and alters, for example if a fault occurrence is detected, the operating mode of the power supply. For example, it controls a redundancy mode, an emergency mode or a load sharing. The parameters of the individual components of the power supply that are reported within the framework of operating online are logged in a memory of the analysis and control unit and are available if required for a later detailed analysis of the power supply. A power supply management according to the invention increases the availability and the reliability of the overall power supply system and thus also of the automation or production system in which the power supply system is used.

As an alternative to the exemplary embodiments described with reference to the figures, the analysis and control unit 7 can, instead of being a personal computer, also be a programming device, a stored-program control or a remote control unit.

A device according to the invention enables in an advantageous manner the analysis and control unit 7 to generate control signals, based upon which the operating mode of the power supply 1 is switched or reprogrammed, for example from a power-supply mode to a charging-device mode. This switchover can be made purely in terms of software or using a switch arranged in the respective power supply component, the switching operation of which is controlled by the analysis and control unit 7. Such a switch is indicated by dashed lines in FIGS. 1 and 2 and is labeled with the reference character 2b.

The invention claimed is:

1. A power supply device comprising:
   a plurality of power supply components;
   a first communication channel connected with the power supply components;
   a concentrator connected with the plurality of power supply components via the first communication channel using a first communication connection; and
   an analysis and control unit connected to the concentrator via a second communication channel using a second communication connection, wherein the concentrator is configured to establish through said second communication channel a different type of communication connection relative to the first communication connection.

2. The device according to claim 1, wherein the analysis and control unit is configured to receive, through said second communication channel in accordance with the different type of communication connection, concentrator output signals, which are based on signals from the plurality of power supply components, said signals from the plurality of power supply components received by the concentrator through the first communication channel in accordance with the first communication connection, wherein the signals from the plurality of power supply components contain status messages concerning the respective power supply component.

3. The device according to claim 2, wherein the analysis and control unit is configured to feed control signals to the power supply components, the control signals being provided to control an operating status of the respective power supply component.

4. The device according to claim 2, wherein the analysis and control unit is configured to feed control programs to the power supply components, the control programs provided to influence the operating status of the respective power supply component.

5. The device according to claim 2, wherein the analysis and control unit comprises, a memory for storing the status messages of the power supply components.

6. The device according to claim 2, wherein the power supply components each comprises a memory for storing the status messages of the respective power supply component and jointly form a plurality of memories.

7. The device according to claim 6, wherein the plurality of memories formed by the power supply components comprises a ring memory.

8. The device according to claim 3, wherein the analysis and control unit feeds control signals to the respective power supply component based on whether a mode of operation of the power supply component is switched over or reprogrammed.

9. The device according to claim 8, wherein the analysis and control unit feeds control signals to the respective power supply component based on whether the mode of operation of the respective power supply component is switched from a power-supply mode to a charging-device mode.

10. The device according to claim 8, wherein a power supply component comprises a switch having a switching operation configured to be controlled by the analysis and control unit.

11. The device according to claim 10, wherein when the switch is switched over, the power supply component is switched over from a first operating mode to a second operating mode.

12. The device according to claim 3, wherein the control signals adjust one of the output voltage, current limitation or overload behavior of the respective power supply component.

13. The device according to claim 1, wherein the power supply components comprise, a load management, and wherein the analysis and control unit controls the load management of the power supply components.

14. The device according to claim 1, wherein the analysis and control unit is selected from a group consisting of: a personal computer, a programming device, a stored-program control or a remote control unit.

15. The device according to claim 1, wherein the first communication connection comprises a wired communication connection thereby establishing a wired communication connection between the plurality of power supply components and the concentrator, and further wherein the second communication connection comprises a wireless communication connection thereby establishing a wireless communication connection between the concentrator and the analysis and control unit.

* * * * *

UNITED STATES PATENT AND TRADEMARK OFFICE
CERTIFICATE OF CORRECTION

PATENT NO. : 7,631,204 B2  Page 1 of 1
APPLICATION NO. : 11/587898
DATED : December 8, 2009
INVENTOR(S) : Hublitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Second Day of November, 2010

David J. Kappos
*Director of the United States Patent and Trademark Office*